Aug. 11, 1936.　　H. D. DORFMAN　　2,050,285
CIRCUIT INTERRUPTER
Filed Oct. 31, 1933　　3 Sheets—Sheet 1

WITNESSES:

INVENTOR
Hiller D. Dorfman.
BY
ATTORNEY

Aug. 11, 1936.　　H. D. DORFMAN　　2,050,285
CIRCUIT INTERRUPTER
Filed Oct. 31, 1933　　3 Sheets-Sheet 3

INVENTOR
Hiller D. Dorfman.
BY F. W. Lyle.
ATTORNEY

WITNESSES:

Patented Aug. 11, 1936

2,050,285

UNITED STATES PATENT OFFICE 2,050,285

CIRCUIT INTERRUPTER

Hiller D. Dorfman, Mansfield, Ohio, assignor to Westinghouse Electric & Manufacturing Company, East Pittsburgh, Pa., a corporation of Pennsylvania Application October 31, 1933, Serial No. 696,036

22 Claims. (Cl. 200—88)

My invention relates to circuit interrupters and particularly to circuit breakers for use in controlling lighting and distribution feeder circuits.

Circuit breakers for this type of service are subjected to very exacting requirements. The normal line current is usually of low magnitude, while the short circuit or overload current which the breaker may be required to interrupt often reaches a very large value, due to the power fed in from other parts of the connecting network. Short circuits or severe overloads must be interrupted substantially instantaneously in order to prevent damage to the wiring and to the protective apparatus, and yet, to avoid unnecessary interruptions of the service, moderate or transient overloads must not be interrupted unless they have persisted for a sufficient period of time to endanger the system. In addition, the cost of the breaker must not be excessive.

These requirements all tend to severely complicate the problem of circuit breaker design, and it is an object of my invention to provide an improved circuit breaker that shall be economical to manufacture, that shall be capable of quickly and efficiently interrupting large amounts of power, that shall operate practically instantaneously upon the occurrence of short circuit or severe overload conditions in the connected circuit, that shall accurately distinguish between severe and moderate overloads to prevent unnecessary interruptions in the power supply, and that shall be provided with means for protecting the various current-carrying parts from damage or injury during the occurrence of abnormal circuit conditions.

It is also an object of my invention to provide an improved trip device for use with electrical apparatus, my improved trip device to include a current-carrying thermally-responsive element and a magnetically-responsive element, the magnetically-responsive element being movable upon the occurrence of predetermined conditions both to actuate the trip mechanism and to limit the current in the thermally-responsive device.

Another object of my invention is to provide an improved trip mechanism for use with multipole circuit breakers, my improved mechanism to include a trip mechanism actuable by any one of a plurality of movable trip members, each of which is controlled by a thermally-responsive element, a plurality of magnetically-responsive elements, each movable to actuate the trip mechanism and to limit the current in one of the thermally-responsive elements, and means whereby the trip elements can be reset through movement of the breaker operating handle.

Another object of my invention is to provide an improved contact structure for use with circuit interrupters, the current path through the contact structure being so arranged that the magnetic reaction acting upon the arc established incident to the interruption of the connected electrical circuit causes the arc to move toward one end of the contact member.

A still further object of my invention is to provide an improved adjusting means for use with trip devices utilizing movable thermally-responsive elements.

Since the principal field for immediate application of my invention is in connection with circuit breakers for low and moderate power circuits, I shall hereinafter describe an embodiment of my invention as applied to such devices, without, however, in any way intending to restrict the scope of my invention except as indicated in the appended claims.

In this embodiment, I provide a plurality of stationary contacts and a plurality of switch members for cooperating therewith to open and to close a plurality of poles, a manually operable actuating mechanism for moving the switch members to the open and to the closed circuit position with a snap action, and a trip device for cooperating with the actuating mechanism so as to cause all of the switch arms to be moved to the open circuit position upon the occurrence of predetermined conditions in the circuit controlled by any one of the poles of the breaker. The method of operation and the structural elements utilized in accomplishing the objects of my invention will be described in detail later.

Referring to the drawings:

Fig. 8 is a fragmentary sectional view showing the circuit breaker operating mechanism and the trip device in tripped position, following the operation of one of the magnetically-responsive trip elements;

Fig. 9 is a view similar to Fig. 8 showing the circuit breaker operating mechanism and the trip device in the tripped position following the actuation of one of the thermally-responsive elements;

Fig. 10 is a fragmentary elevational view showing the details of one of the magnetically-responsive trip elements;

Fig. 11 is a fragmentary sectional view taken on the line XI—XI of Fig. 10; and, Fig. 12 is an exploded perspective view showing the details of the contact structure used in this embodiment of my invention.

Figure 1:
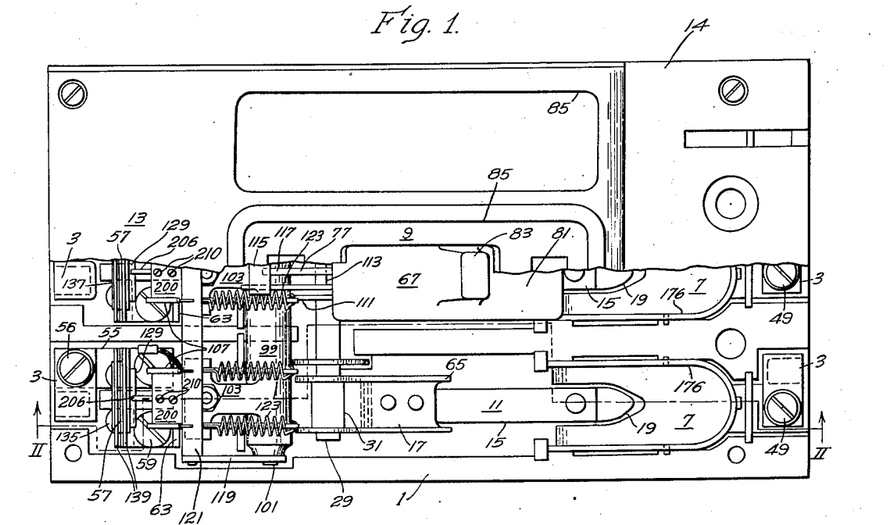
Figure 1 is a plan view of a three-pole circuit breaker embodying the principal elements of my invention, a portion of the cover has been cut away to more clearly illustrate the structural features involved.
Figure 2:
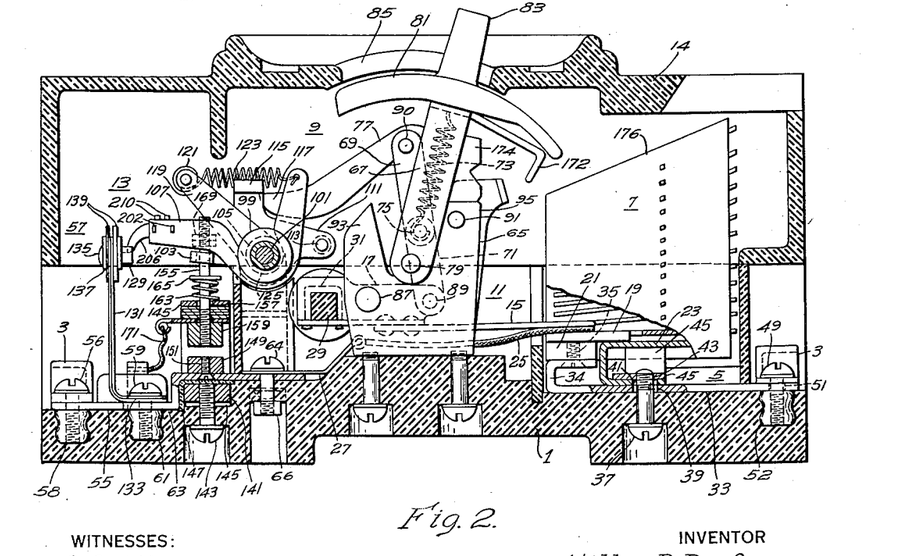
Fig. 2 is a sectional view, partially in elevation, of the circuit breaker shown in Fig. 1 on the line II—II of that figure.

As shown in Figs. 1 and 2, the base 1 of the circuit breaker is of molded insulating material and has mounted thereon six terminal contacts 3—two for each of the three poles of the breaker—three stationary contact assemblages 5, an arc extinguishing device 7 for each of the three poles, the circuit breaker operating mechanism 9, which has associated therewith the three movable switch members 11, and the trip device 13. A cover 14, which is preferably of molded insulating material, is provided for enclosing and protecting the breaker mechanism. Each of the switch members 11 includes a resilient switch arm 15, preferably of spring steel, which is riveted at one end to the associated switch member frame 17 and which supports a moving contact member 19 at the other end. Each of the moving contact members 19 is adapted to cooperate with one of the main stationary contact members 21 and one of the arcing contacts 23, which are shown particularly in Fig. 12.

A flexible shunt 25 is provided for connecting each of the moving contacts 19 with one of the conducting members 27 which serve to complete the electric circuit from the shunts 25 to the trip device 13. The three switch member frames 17, which are substantially channel-shaped, are rigidly connected together by means of an insulating tie-bar 29 which extends through suitable openings in the sides of the frames, the tie-bar being rigidly fastened to each of the frame members 17 by means of a strap member 31.

Figures 8, 9, 10, 11, 12:
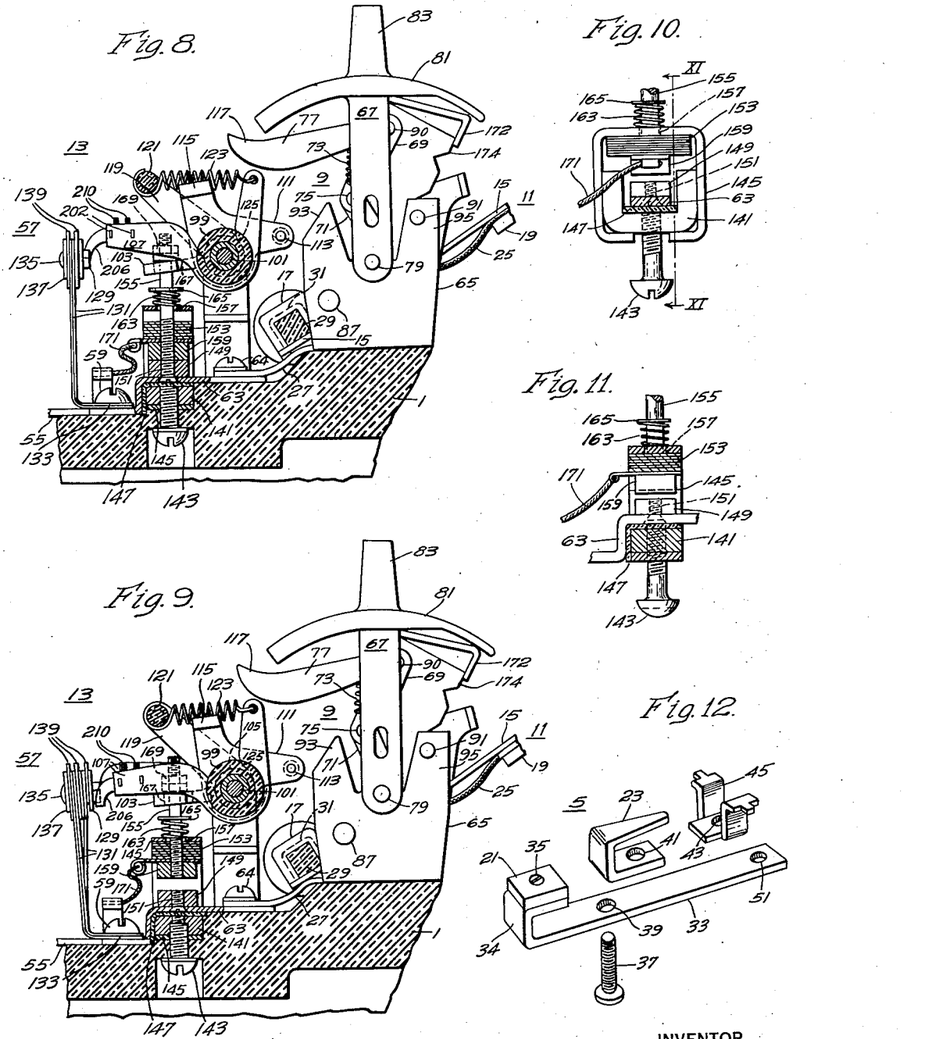

Each of the stationary contact assemblages 5 as is particularly shown in Figs. 2 and 12, includes a main support or base strip 33 having a looped portion 34 at one end thereof, and a stationary contact member 21 which is preferably of a silver graphite composition, affixed to, and supported on, this looped portion 34 by means of a screw 35. Each of the contact assemblages 5 is supported on the base 1 of the circuit breaker by means of a screw 37 which extends through the opening 39 in the base strap 33, a similar opening 41 in the lower portion of the looped arcing contact 23, and engages a threaded opening 43 in the central portion of one of the U-shaped supports 45 for the arc extinguishers 7. The looped arrangement of the current paths through each of the three contact assemblages 5 causes the magnetic reactions acting on the arcs formed incident to the interruption of the circuit to bias those arcs in the direction of the arc extinguishers 7. The U-shaped supports 45 are preferably constructed of iron and not only serve to position and support the stationary contact assemblages 5 and the arc extinguishers 7 but, in addition, serve to aid in the arc extinguishing operation by facilitating movement of each of the arcs along the arcing contact 23. This magnetically produced movement of each of the arcs in the direction of the arc extinguishers 7 is further facilitated due to the fact that the looped arcing contact 23 is made of pure nickel, a magnetic material.

One of the terminal contacts 3 is electrically connected to the base strip 33 of each of the stationary contact assemblages 5 by means of a screw 49 which extends through the openings 51 therein to engage a threaded retaining member 52 which is embedded in the base 1.

Suitable conducting strips 55 are provided for connecting the terminals 3 on the trip mechanism end of the circuit breaker with the trip device 13, three screws 56 which engage threaded retaining members 58 embedded in the base 1 being utilized for electrically connecting the terminals with the strips. Each of the strips 55 is, in turn, electrically connected to one end of one of the U-shaped, current-carrying, thermally-responsive elements 57, which form a portion of the trip device 13, by means of a similar screw 59 and embedded retaining members 61. The other end of each of the U-shaped thermally-responsive elements 57 is connected to a third conducting strap 63 by means of a second screw 59 and retaining member 61. The conducting strips 63 are affixed to the base 1 of the circuit breaker by means of suitable screws 64 and nuts 66 which also serve to electrically connect the strips with the conducting member 27.

The electrical circuit for each of the poles is essentially the same; beginning with the terminal contact 3, at the trip mechanism end of the breaker, the current flows successively through the conducting strip 55, the U-shaped, thermally-responsive element 57, the conducting strip 63, the conducting member 27, the flexible shunt 25, the movable contact member 19, the stationary contact member 21, and thence through the supporting strap 33 to the other terminal contact 3.

The operating mechanism 9, which is of the quick-make and quick-break type, is supported on a U-shaped frame member 65, and includes a bifurcated operating handle 67, two pivotally joined toggle links 69 and 71 for engaging the interconnected switch members 11, a pair of over-center springs 73 for operatively connecting the handle 67 with the knee pivot pin 75 of the toggle linkage, and the cradle 77 for releasably engaging one end of the toggle linkage so as to provide a means whereby actuation of the trip device 13 can cause the operating mechanism 9 to automatically move all of the switch members 11 to the open circuit position. The bifurcated operating handle 67 is pivotally supported on the U-shaped frame 65 by means of two pivot pins 79, one of which engages the end of each of the bifurcated portions. An insulating shield 81 having a projecting portion 83 which extends through an opening 85 in the circuit breaker cover 14 is provided for permitting manual operation of the circuit breaker.

Figure 3:
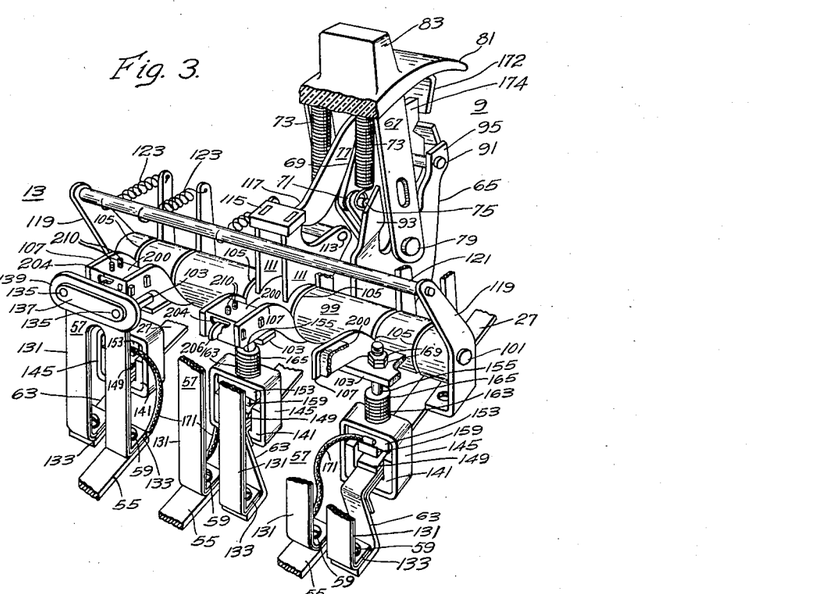
Fig. 3 is a fragmentary perspective view showing the details of my improved trip device and a portion of the circuit breaker actuating mechanism.

The interconnecting switch members 11 are pivotally supported on the U-shaped frame 65 by means of a pin 87 which engages the frame 17 of the central switch member 11. One end of the lower toggle link 71 is likewise pivoted to the frame 17 of the central switch member through the agency of a pin 89 (Fig. 2) which provides the only mechanical connection between the operating mechanism and the switch members. The other end of the toggle link 71 is pivotally connected to the lower end of the upper toggle link 69 by means of the knee pivot pin 75. The knee pivot pin extends for some distance on either side of the pivotally joined toggle links, and each of the projecting portions is adapted to be engaged by one end of the over-center operating springs 73, the other end of the operating springs 73 being fastened to the central portion of the bifurcated operating handle 67. The upper end of the toggle link 69 is pivotally fastened (by a pin 90) to the carrier member 77 which, in turn, is pivotally supported on the U-shaped frame 65 by means of a pin 91. The limits of motion of the bifurcated operating handle 67 are defined by the off-set projections 93 and 95 shown particularly in Fig. 3.

The trip device 13 includes, as mentioned previously, three U-shaped current carrying thermally-responsive elements 57, one of which is connected in series with each of the poles of the breaker, and in addition, includes three magnetically-responsive trip elements, each of which is operable upon the occurrence of predetermined conditions both to actuate the trip device and to limit the current flow in one of the thermally-responsive elements. Heretofore, considerable difficulty has been experienced in securing a simple, current-carrying, thermally-responsive element which was capable of opening the circuit after a predetermined time delay upon the occurrence of moderate overload conditions, and which would not be damaged so as to cause a change in its calibration upon the occurrence of a heavy overload or short circuiting conditions. This difficulty has been caused chiefly by the great difference in magnitude between ordinary overload and short circuit currents on certain circuits, and has resulted in a very definite limiting of the minimum amount of current for which a circuit breaker trip device could be operated.

The difficulty is especially aggravated in that short circuit or heavy current arcs have a tendency to persist for an appreciable period of time, and a current-carrying, thermally-responsive element is, of course, subjected to the heating effect of the arc during this period. The one solution which has helped to alleviate the difficulties heretofore encountered has been the provision of a trip device which included a thermally-responsive and magnetically-responsive trip element, the magnetically-responsive trip element being movable to cause instantaneous operation of the trip device upon the occurrence of severe overload conditions. Even this arrangement has not been entirely satisfactory, since it in no way lessens the likelihood of damage to the current-carrying, thermally-responsive device during the period of arc extinguishment. My invention, however, not only secures instantaneous operation of the trip device upon the occurrence of short circuit or heavy overload conditions, but at the same time, limits the current flow through the current-carrying thermally-responsive element, thus preventing any change in the calibration of the device and assuring reliable operation of the interrupter over all possible operating conditions.

Figure 4:
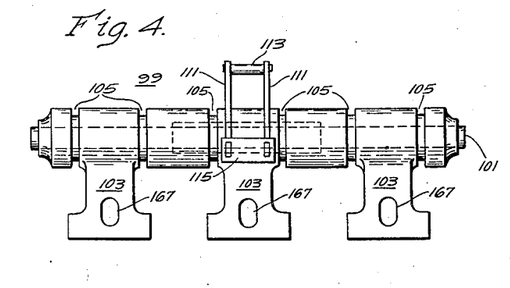
Fig. 4 is an elevational view of the trip bar used in this embodiment of my invention.
Figure 5:
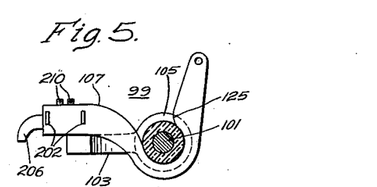
Fig. 5 is a fragmentary view, partially in section, showing the trip bar of Fig. 4 and one of the trip members.

The trip device 13 also includes a pivotally supported trip bar 99 (Figs. 4 and 5) of molded insulating material which has a centrally disposed metallic support member 101 molded therein; the trip bar 99 is provided with three outwardly projecting members 103 formed integral therewith, six annular slots 105 for supporting the trip members 107, and a means for engaging the circuit breaker operating mechanism. This engaging means includes a pair of substantially parallel plate sections 111 which are rigidly affixed to the trip bar, a pin 113 which connects the two plate sections 111 and provides a means for making possible the re-setting of the trip device and a latch member 115 which is adapted to engage the end 117 of the carrier 77 when the trip device is in the untripped position. The trip bar 99 is pivotally supported on a pair of upstanding bracket members 119, connected at their upper end by an insulating rod 121. This rod 121 is used as a support for one end of the springs 123 which individually bias the trip members 107 to the tripped position.

Each of the bifurcated trip members 107, as is shown particularly in Figs. 3, 5, 6 and 7, comprises a frame member which is adapted to be supported on the trip bar 99 and an adjustable means for engaging one of the thermally responsive trip elements 57. The two side portions of each of the bifurcated trip members 107 have aligned, substantially semi-circular slots 125 therein, and it is through the agency of these slots and the annular slots 105 in the trip bar 99 that the trip members 107 are supported on the trip bar 99 so as to be individually movable independently thereof. The slots 125 in the trip members 107 and the annular slots 105 in the trip bar 99 are of substantially the same radius, thus the slidable movement of the trip members is essentially one of rotation about the axis of the trip bar itself. Each of the trip members 107 is biased to the tripped position, as mentioned above, by two of the springs 123 and is retained in the untripped position through the releasable engagement of the adjustable engaging means with one of the thermally-responsive elements 57.

Figure 6:
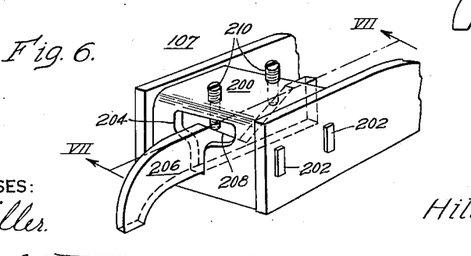
Fig. 6 is a fragmentary perspective view showing the details of the wedge-adjusting means used with each of the thermally-responsive trip elements.
Figure 7:
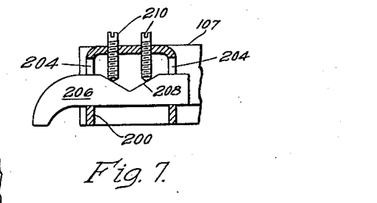
Fig. 7 is a sectional view on the line VII—VII of Fig. 6.

The adjustable engaging means for each of the poles is shown particularly in Figs. 6 and 7 and comprises a supporting frame 200 rigidly affixed to the sides of each of the bifurcated trip members 107 by means of four lugs 202 which engage suitable openings in the side portions of each of the trip members and are therein swedged over. Each of the frame members 200 is substantially U-shaped and is provided with two aligned Y-shaped openings 204 for slidably supporting a member 206 which engages the associated thermally-responsive element 57. This engaging member 206 has a notch 208 in the upper portion thereof which is adapted to be engaged by a pair of set screws 210 disposed in two threaded openings in the top portion of each of the support members 200. The notch 208 and the two set screws 210 cooperate to permit the individual engaging members 206 to be moved so as to control and adjust the distance which the engaging member 206 overhangs the latch plate 129 of the thermally-responsive element, i. e. the distance the thermally responsive element must move to release the trip element. The movement of the latch-engaging members 206 under the action of the set screws 210 is essentially the same as that of a screw actuated wedge and permits very accurate adjustments to the individual trip elements to be made with a minimum of inconvenience. Another advantage of my improved adjusting means results from the fact that the movement of the engaging member is essentially at right angles to the axis of rotation of the set screws which effect this movement. Thus, it is possible to completely assemble the various structural elements of the circuit breaker and then make the necessary adjustments to correct for manufacturing inaccuracies by means of a screw driver.

Heretofore, most of the adjusting means used in connection with circuit breaker trip devices have been adjustable only through the rotation of a member whose axis substantially coincided with the direction in which the adjusting was effected. This arrangement usually required a locking nut or other means for maintaining the permanency of the adjustment once it was made, and it often happened that in tightening up the locking means the original adjustment was disturbed, thereby necessitating a repetition of the entire adjusting operation. My device, however, is entirely self-locking and once the engaging member is adjusted, it is not necessary to further tamper with the device in any way.

The thermally-responsive elements 57 each comprise a U-shaped member 131 of bimetallic material, the ends of which are bent over at substantially right angles, in order to form a pair of terminal portions 133. A latch plate 129 is affixed to the upper end of each of the bimetallic members 131 by means of two rivets 135 which extend through enlarged openings (not shown) in the bimetallic member and serve to mechanically interconnect the latch plate and the metallic retaining plate 137. Each of the latch plates 129 and their associated retaining plate 131 are insulated from the adjacent portions of the bimetallic element 131 by means of a pair of mica plates 139.

When any one of the thermally-responsive elements 57 moves a sufficient distance away from the operating mechanism 9, in response to a predetermined overload condition in the connecting circuit, to release the engaging member 206 of the associated trip member 107, that member is then free to move in a counter-clockwise direction (Fig. 9) about the axis of the trip bar 99 under the biasing action of the springs 123. This movement is subsequently transmitted to the trip bar itself, through the engagement of the two side portions of the released trip member 107 with the end of the adjacent projecting member 103 and causes the trip bar to rotate a sufficient distance in a counter-clockwise direction to effect a disengaging of the end 117 of the carrier 77 by the carrier engaging plate 115. The disengaging of the carrier 77 allows that member to rotate in a clockwise direction about its pivot pin 91 under the influence of the over-center operating springs 73 and, as will be explained in some detail later, causes all of the switch members 11 to move to the open circuit position with a snap action.

Each of the magnetically-responsive trip devices includes a core member 141, which is affixed to the base 1 by means of a screw 143, and a yoke of non-magnetic material 145 which fits around the core member 141 and is held in position between that member and the base 1 through the force exerted by the screw 143. Each of the conducting strips 63 extends through the central portion of one of the U-shaped core members 141, being insulated therefrom by means of the strip 147 of insulating material, and is provided with a contact member 149 affixed thereto by means of a screw 151. These strips 63 each of which carries the entire current flowing through the associated pole of the breaker, serve as energizing means for the core members 141.

A movable armature 153 is slidably supported on the upper portion of each of the yoke members 145 by means of a pin 155 which extends through a guide opening 157 in the yoke. This armature is provided with a contact member 159 for cooperating with the similar contact member 149 affixed to the adjacent conducting strip 63, and is biased away from the core member 141 by means of a spring 163 which cooperates with a washer 165 rigidly affixed to the pin 155. The upper end of each of the pins 155 is threaded and is adapted to extend through one of the openings 167 in the projecting portions 103 of the trip bar 99. A pair of nuts 169 is provided for mechanically connecting each of the armatures to the trip bar.

Each of the contact members 159, which are supported on the movable armatures 153, is electrically connected by means of a flexible shunt 171 to the opposite terminal 133 of the adjacent U-shaped, bimetallic element 57 to which the adjacent contact member 149 is connected. Thus upon the occurrence of a short circuit or predetermined heavy overload condition in any one of the poles of the breaker, the moving armature 153 for that pole is attracted to the cooperating core member 141 against the biasing action of the associated spring 163, and in moving to the attracted position, serves to rotate the trip bar 99 to the tripped position, and to simultaneously short circuit the two terminals 133 of the connected, thermally-responsive element 57, thereby limiting the current flow through that element during the arc extinguishing operation. This limiting of the current flow prevents undue heating of the bimetallic elements and is of great value in preserving the calibration thereof.

The circuit breaker is shown in Fig. 2 in the closed circuit position, the trip device 13 being in the untripped position. To open the contacts manually the operating handle 67 is moved in a counter-clockwise direction about its pivot point (the pins 79). This movement brings the line of action of the operating springs 73 to the left of the line connecting the center of the knee pivot pin 75 and the center of the pivot pin 90 which connects the upper toggle link 69 to the carrier, and in so doing, produces a component of force which biases the knee pivot pin away from the over-center or closed circuit position toward the collapsed position. Before the operating handle 67 reaches the full-on position, this component becomes sufficiently great to set the mechanism in motion, and, since any movement of the knee pivot pin 75 from the closed circuit position toward the open circuit position results in a progressive increase in the component of force exerting that pin toward the open circuit position, the opening operation once started proceeds automatically with an increasing acceleration, irrespective of the rate of the movement of the operating handle. The collapse of the toggle mechanism causes the interconnected switch members 11 to rotate about their pivot point (the pin 87) to the position shown in Fig. 8 and Fig. 9.

To close the contacts manually the operating handle is moved from the open circuit position in a clockwise direction (Fig. 2) toward the closed circuit position. As soon as the line of action of the overcenter springs 73 crosses the center line of the upper link 69, that link is caused to move toward the over-center or closed circuit position, in which position the toggle holds the contacts in the closed circuit position irrespective of the force exerted by the overcenter operating springs. The closing operation takes place, as does the opening operation, with a snap action.

When the breaker is in the closed circuit position, the carrier 77 is biased in a clockwise direction about its pivot point (the pin 91) by the reaction forces of the springs 73 and is restrained in the operative position through the engagement of the end 117 thereof with the latching member 115 on the trip bar 99. Upon the occurrence of a moderate overload in the circuit controlled by any one of the poles of the breaker which is of sufficient magnitude and duration to cause the serially connected, thermally-responsive element 57 to deflect and release its associated trip member 107, that member, under the biasing action of the springs 123 moves to rotate the trip bar 99 to the tripped position, thereby releasing the carrier 77. The subsequent rotation of the carrier 77 brings the line of action of the over-center springs 73 to the left of the center line of the upper toggle link 69, and thus causes the toggle to move to the open circuit, collapsed position, regardless of the position of the operating handle 67. The breaker is, therefore, entirely trip-free. The position of the various structural elements of the breaker following the actuation of one of the thermally responsive trip elements 57 is shown in Fig. 9.

Upon the occurrence of a large overload or short circuit condition in the circuit controlled by any one of the poles of the breaker, the trip bar 99 is moved from the untripped to the tripped position by movement of the armature 153 of the effected magnetically-responsive element which simultaneously short-circuits the associated current carrying, thermally-responsive element 57. It should be noted that the tripping operation when carried on by one of the magnetically-responsive devices in no way effects the position of the trip members 107, those members being slidably supported on the trip bar through the engagement of the slots with the annular slots in the trip bar itself. Figure 8 shows the breaker in the tripped position immediately following the actuation of one of the magnetically responsive trip elements.

Following each opening of the circuit as a result of an operation of the trip device 13, it is necessary to restore the operating mechanism 9 and the trip device 13 to an operative condition. This is done by rotating the operating handle 67 in a counter-clockwise direction from the position shown in Figs. 8 and 9 (the two tripped positions) to the position shown in Fig. 3 (the open circuit position). The counter-clockwise movement of the operating handle 67 is transmitted to the carrier 77 through the engagement of the downwardly projecting member 172 with the portion 174 of the carrier. As the carrier is rotated the end 117 thereof engages the pin 113 which forms a part of the mechanism engaging means and, since that pin is rigidly connected to the trip bar 99, causes the trip bar to rotate in a clockwise direction a sufficient distance to permit the latch member 115 to re-engage the end 117 of the carrier. This re-engagement occurs somewhat before the operating handle 67 reaches its limit of motion in a counter-clockwise direction.

The rotation of the trip bar 99 not only effects the re-engaging of the operating mechanism 9 and the trip device 13, but in addition, causes a re-setting of both the thermally-responsive and the magnetically-responsive elements of the trip device. This is accomplished by the engagement of the projecting portions 103 of the trip bar with the side portions of the trip elements 107 and with the pins 155. The positive separation of the contacts 149 and 159 which necessarily accompanies the resetting operation is of great value in increasing the reliability of operation of the device, because it positively assures the restoring of the thermally-responsive elements to an operative condition following each operation of the current-limiting magnetically-responsive device, despite any welding of the contacts which might occur.

The re-setting of the trip elements 107 and the re-engaging of the operating mechanism 9 by the trip device 13 restores the circuit breaker to an operative condition in the open circuit position. The contacts may then be manually moved to the closed circuit position exactly as described above.

As shown in Figures 8 and 9, the operating handle 67 moves to a position midway between the normal closed circuit and open circuit positions following each operation of the trip device 13. This provides a convenient and satisfactory means for indicating that the breaker mechanism must be reset before the circuit can again be closed.

The arc extinguishers which I prefer to use with this embodiment of my invention are of the spaced plate type, and comprise generally a stack of slotted plates of magnetic material which are insulated from each other and are positioned adjacent the path of movement of the associated moving contact member. Following the initiation of arc incident to the separation of the current carrying contact members, the presence of these plates produces a magnetic reaction which causes the arc to move in a direction toward the ends of the slots therein. This movement results in the breaking up of the arc into a plurality of serially connected short arcs as soon as the single arc reaches the end of the slots and shortly thereafter causes the extinguishment of the several short arcs. The slotted plates which are used in the preferred form of this arc extinguisher are supported in spaced relationship with each other by means of a U-shaped member 176 of insulating material disposed about the plates, as is shown generally in Figs. 1 and 2.

It will thus be seen that I have disclosed an improved circuit breaker which is more reliable and accurate in its operation than the previously known devices of this type, and which, at the same time, is simple in structure and is economical to manufacture. My improved circuit breaker is trip free of the operating handle under all operating conditions; it is snap-acting during both the opening and closing operations; and in addition, it includes a novel trip device which is operable to cause the circuit breaker actuating mechanism to move all of the switch members to the open circuit position after a time delay upon the occurrence of overload conditions. Further, the trip device of my invention is operable to cause the interruption of the controlling circuit substantially instantaneously upon the occurrence of a short circuit or overload condition and, has means associated therewith for protecting the thermally-responsive elements from overload currents of large magnitude. I have also disclosed an improved means for easily and accurately, individually adjusting a plurality of thermally-responsive trip elements, my improved adjusting means permitting the calibration of a completely assembled multi-pole circuit breaker without any dismantling other than the removal of the cover.

While in accordance with the patent statutes I have disclosed the foregoing details of a practical embodiment of my invention, it is to be understood that many of these details are merely illustrative and that variations in their precise form will be not only desirable but necessary in some applications. I desire, therefore, that the language of the accompanying claims shall be accorded the broadest reasonable construction, and that my invention shall be limited only by what is expressly set forth in the claims and by the prior art.

I claim as my invention:

1. In electrical apparatus, means movable to actuate said apparatus, an electro-responsive means, and adjustable means intermediate said electro-responsive means and said means movable to actuate said apparatus, said adjustable means comprising guide means, a member supported for axial movement in said guide means, and means, which is rotatable at least during the assembling and calibrating of said apparatus, for moving said member in said guide means and for retaining said member in said guide means.

2. In electrical apparatus, means movable to actuate said apparatus, an electro-responsive means, and adjustable means intermediate said electro-responsive means and said means movable to actuate said apparatus, said adjustable means comprising guide means, a member supported for axial movement in said guide means, and a screw-actuated wedge means for controlling the movement of said member.

3. In electrical apparatus, means movable to actuate said apparatus, an electro-responsive means, and adjustable means intermediate said electro-responsive means and said means movable to actuate said apparatus, said adjustable means being movable independently of said electro-responsive means and including a movable member for directly engaging said electro-responsive means, guide means for said movable member and rotatable means for moving said member with respect to said guide means to change the relative positions of said electro-responsive means and said movable member.

4. In electrical apparatus, means movable to actuate said apparatus, means biasing said movable means to one position, thermally responsive means for holding said movable means against movement by said biasing means, and adjustable means associated with said movable means for engaging said thermally responsive means, said adjustable means including a movable member, and cam means for engaging and adjusting said member.

5. In electrical apparatus, means movable to actuate said apparatus, an electro-responsive means, and adjustable means intermediate said electro-responsive means and said means movable to actuate said apparatus, said intermediate means comprising guide means, a member having a notch therein, supported for movement in said guide means, and a pair of threaded members adapted to engage said notch to adjust and to position said member with respect to said guide means.

6. In electrical apparatus, a movable electro-responsive means, means movable in response to movement of said electro-responsive means to actuate said apparatus, and means intermediate said electro-responsive means and said means movable to actuate said apparatus for determining the point at which said electro-responsive means effects the operation of said apparatus, said intermediate means including means for defining at least two opposed guide surfaces, a member supported for slidable movement in the space between said opposed guide surfaces, and means, which is rotatable at least during the assembling and the calibrating of said apparatus, for slidably moving said member within the space between said opposed guide surfaces and for retaining said member in a fixed position within said space.

7. In electrical apparatus, means movable to actuate said apparatus, an electro-responsive means, and means intermediate said electro-responsive means and said means movable to actuate said apparatus, said intermediate means including means for defining the opposed surfaces of a substantially rectangular passageway, a member, having at least a portion thereof of rectangular cross section, disposed within said passageway and being axially movable therein, said opposed surfaces serving as a guide means for said movable member, and means, which is rotatable at least during the assembling and calibrating of said apparatus, for moving said movable member in said guide means therefor and for retaining said movable member in said guide means.

8. In a circuit interrupter, means for opening and for closing the circuit, means for actuating said means for opening and for closing the circuit, and a trip device, including means for operatively engaging said actuating means, current-carrying, thermally responsive means for causing said actuating means to move said means for opening and for closing the circuit to the open circuit position, adjustable means intermediate said thermally responsive means and said actuating means, and magnetically responsive means movable upon the occurrence of predetermined conditions to cause said actuating means to move said means for opening and for closing the circuit to the open circuit position and to limit the current flow in said thermally responsive means.

9. In a circuit interrupter, means for opening and for closing the circuit, means for actuating said means for opening and for closing the circuit, and a trip device including a pivotally supported member for releasably engaging said actuating means, current-carrying means having a thermally responsive bimetallic member associated therewith, said bimetallic member being movable when heated to cause said pivotally supported member to disengage said actuating means, adjustable means for defining the amount of movement of said bimetallic member necessary to cause said pivotally supported member to disengage said actuating means, and magnetically responsive means movable, independently of said current-carrying means, upon the occurrence of predetermined conditions to cause said pivotally supported member to disengage said actuating means and to limit the current flow in said thermally responsive means, said actuating means, when disengaged by said pivotally supported member causing said means for opening and for closing the circuit to move to the open circuit position.

10. In a circuit interrupter, means for opening and for closing the circuit, means including an operating handle for actuating said means for opening and for closing the circuit, and a trip device operable to cause said actuating means to move said means for opening and for closing the circuit to the open circuit position independently of the position of said operating handle, said trip device including a current-carrying thermally responsive trip element actuable to effect the operation of said trip device, a magnetically responsive trip element also actuable to effect the operation of said trip device, and adjustable means for defining the point at which said thermally responsive trip element actuates said trip device, said magnetically-responsive trip element having means associated therewith which is operable during each operation thereof to limit the current flow through said current carrying thermally responsive element.

11. In a circuit interrupter, means for opening and for closing the circuit, means for actuating said means for opening and for closing the circuit, and a trip device, including means for operatively engaging said actuating means, said actuating means being movable in response to the operation of said trip device to cause said means for opening and for closing the circuit to move to the open circuit position, a trip member movable to operate said trip device, a current-carrying, thermally responsive element, which engages said trip member through adjustable means, for controlling the movement of said member, and magnetic means actuable upon the occurrence of predetermined conditions to operate said trip device and to limit the flow of current in said current-carrying, thermally responsive element without opening the electrical circuit through said current-carrying, thermally responsive element.

12. In a multi-pole circuit interrupter, means for opening and for closing a plurality of poles, means for actuating said means for opening and for closing a plurality of poles, and a trip device including means for operatively engaging said actuating means, a plurality of current-carrying, thermally responsive elements, a plurality of magnetically responsive elements, and individual adjusting means associated with at least some of said plurality of thermally responsive elements for controlling the operation thereof, said actuating means causing said means for opening and for closing a plurality of poles to move to the open circuit position upon the operation of said trip device, said trip device being operable by any one of said adjustable, thermally responsive elements or any one of said magnetically responsive elements, each of said plurality of magnetically responsive elements including means operable upon the occurrence of predetermined conditions to limit the current flowing in one of said current-carrying thermaly responsive elements without opening the electrical circuit through said current-carrying, thermally responsive element.

13. In a multi-pole circuit interrupter, means for opening and for closing a plurality of poles, means for actuating said means for opening and for closing a plurality of poles, and a trip device including means for operatively engaging said actuating means, said actuating means automatically moving said means for opening and for closing a plurality of poles to the open circuit position upon the operation of said trip device, a plurality of trip members each individually movable to operate said trip device, a plurality of current-carrying, thermally responsive elements each of which controls the movement of one of said trip members, each of said trip members operatively engaging the associated thermally responsive elements through adjustable engaging means, and a plurality of magnetically responsive elements each individually operable upon the occurrence of predetermined conditions to operate said trip device and to limit the current flow in one of said current carrying, thermally responsive elements without opening the electrical circuit through said current carrying, thermally responsive element.

14. In a multi-pole circuit interrupter, means for opening and for closing a plurality of poles, means for actuating said means for opening and for closing a plurality of poles, and a trip device including means for releasably engaging said actuating means, said actuating means automatically moving said means for opening and for closing a plurality of poles to the open circuit position when disengaged by said releasable engaging means, a plurality of thermally responsive elements, a plurality of trip members each individually movable from a normal untripped position to a tripped position to cause said engaging means to disengage said actuating means, means biasing each of said trip members to the tripped position, each of said plurality of thermally responsive elements releasably restraining one of said trip members in the untripped position, each of said trip members engaging the associated thermally responsive element through adjustable means, and a plurality of magnetically responsive elements, each individually operable, independently of said thermally responsive trip elements and the trip members associated therewith, upon the occurrence of predetermined conditions to cause said engaging means to disengage said actuating means.

15. In a multi-pole circuit interrupter, means for opening and for closing a plurality of poles, means for actuating said means for opening and for closing a plurality of poles, and a trip device including means for operatively engaging said actuating means, said actuating means automatically moving said means for opening and for closing a plurality of poles to the open circuit position upon the operation of said trip device, a plurality of trip members each individually movable to operate said trip device, a plurality of current-carrying, thermally responsive elements each of which controls the movement of one of said trip members, each of said trip members operatively engaging the associated thermally responsive elements through adjustable engaging means, and a plurality of magnetically responsive elements each individually operable upon the occurrence of predetermined conditions to limit the current flow in one of said current carrying thermally responsive elements and to operate said trip device.

16. In a circuit interrupter, means for opening and for closing the circuit, means for actuating said means for opening and for closing the circuit, and a trip device, including means for operatively engaging said actuating means, thermally responsive means operable upon the occurrence of predetermined conditions to cause said actuating means to move said means for opening and for closing the circuit to the open circuit position, means adjustable at least during the assembling and calibrating of said interrupter, intermediate said thermally responsive means and said actuating means, and magnetically responsive means movable upon the occurrence of predetermined conditions to cause said actuating means to move said means for opening and for closing the circuit to the open circuit position and to limit the current flowing in said current carrying thermally responsive means, said adjustable means, intermediate said electro-responsive means and said means movable to actuate said means for opening and for closing the circuit, including guide means, a member supported for axial movement in said guide means, and rotatable means for moving said member in said guide means and for retaining said member in said guide means, said adjustable means allowing the point of operation of said current carrying thermally responsive means to be adjusted independently of the point of operation of said magnetically responsive means.

17. In a circuit interrupter, means for opening and for closing the circuit, means for actuating said means for opening and for closing the circuit, and a trip device, including means for releasably engaging said actuating means, said actuating means, when disengaged by said releasable engaging means causing said means for opening and for closing the circuit to move to the open circuit position, a trip member movable to a tripped and to an untripped position, which, when moved from the untripped to the tripped position, causes said engaging means to disengage said actuating means, means biasing said member to the tripped position, a current carrying thermally responsive means, which engages the trip member through means adjustable at least during the assembling and calibrating of said interrupter, for restraining said trip member against said biasing means, and a magnetically responsive means, operable upon the occurrence of predetermined conditions to cause said trip device to disengage said actuating means, thereby causing said actuating means to move said means for opening and for closing the circuit to the open circuit position and, at the same time, limiting the current flow in the current carrying thermally responsive means in order to prevent injury thereto.

18. In electrical apparatus, a base, members supported in compact arrangement on said base comprising means movable to actuate said apparatus, an electro-responsive means for controlling the movement of said actuating means, and adjustable means associated with said actuating means for operatively engaging said electro-responsive means, said adjustable means including a sliding member movable toward and from said electro-responsive means and a rotatable member adjustable for moving said sliding member with respect to said actuating means, said rotatable member being disposed at a substantial angle to the plane of said base to facilitate the adjustment of said rotatable member.

19. In electrical apparatus, a base, members supported in compact arrangement on said base comprising means movable to actuate said apparatus, thermally responsive means for controlling the movement of said actuating means, and adjustable means associated with said actuating means for operatively engaging said thermally responsive means, said adjustable means including a sliding member movable toward and from said thermally responsive means and a rotatable member adjustable for moving said sliding member with respect to said actuating means, said rotatable member being disposed at a substantial angle to the plane of said base to facilitate the adjustment of said rotatable member.

20. In a circuit interrupter, means for opening and closing the circuit, a movable member having a fixed pivot point about which it is rotatable, means biasing said movable member to rotate about said fixed pivot point and cause the opening of said means for opening and closing the circuit, electro-responsive means, and a latch element mounted on said movable member normally in overlapping engagement with said electro-responsive means and through which said movable member is releasably held against movement by its biasing means, said latch element being adjustably mounted on said movable member for varying the amount of overlap with said electro-responsive means by which it is held.

21. In a circuit interrupter, means for opening and closing the circuit, a movable member having a fixed pivot point about which it is rotatable, means biasing said movable member to rotate about said fixed pivot point and cause the opening of said means for opening and closing the circuit, electro-responsive means, and a latch element mounted on said movable member normally in overlapping engagement with said electro-responsive means and through which said movable member is releasably held against movement by its biasing means and rotatable camming means for adjusting the position of said latch element on said movable member and the amount of overlap with said electro-responsive means by which it is held.

22. In a circuit interrupter, means for opening and closing the circuit, a movable member having a fixed pivot point about which it is rotatable, means biasing said movable member to rotate about said fixed pivot point and cause the opening of said means for opening and closing the circuit, a bimetallic member fixedly mounted at one end and movable at the other end, and a latch element mounted on said movable member normally in overlapping engagement with said movable end of the bimetallic member and through which said movable member is releasably held against its biasing means by said bimetallic member, and means for adjusting the position of said latch element on said movable member and the amount of overlap with said bimetallic member.

HILLER D. DORFMAN.